US006527321B1

United States Patent
Kuciauskas

(10) Patent No.: US 6,527,321 B1
(45) Date of Patent: Mar. 4, 2003

(54) CANE AND GRABBER

(76) Inventor: Alex Kuciauskas, N1890 Forest Lake, Campbellsport, WI (US) 53010

( * ) Notice: Subject to any disclaimer, the term of this patent is extended or adjusted under 35 U.S.C. 154(b) by 0 days.

(21) Appl. No.: 10/105,596

(22) Filed: Mar. 26, 2002

(51) Int. Cl.$^7$ ................ A45B 3/00; B25J 1/02
(52) U.S. Cl. ................ 294/3; 294/118; 135/66
(58) Field of Search .............. 294/16, 19.1, 24, 294/50.8, 118, 3; 135/66, 74

(56) References Cited

U.S. PATENT DOCUMENTS 3,879,079 A    4/1975  Nicholas

Primary Examiner—Dean J. Kramer
(74) Attorney, Agent, or Firm—Donald Cayen; Nicholas A. Brannen

(57) ABSTRACT

A combination walking cane and grabber is provided to aid in walking and for grabbing an object and picking it up from the ground while the user remains standing. The invention has two arms that pivot relative to each other. Each arm has first and second ends. A gripping piece is integral with the first end of each arm. A slot is located proximal the second end of each arm. In one embodiment, each gripping piece comprises an ear, a lug, and a pad. One function is that of a cane. The cane has a handle, shaft and a foot. A second function is that of a grabber. The user manipulates the slots to urge the gripping pieces towards each other. The gripping pieces cooperate together to grab objects from the ground. The arms are pivoted nearly 360 degrees relative to each other to switch between functions.

14 Claims, 3 Drawing Sheets

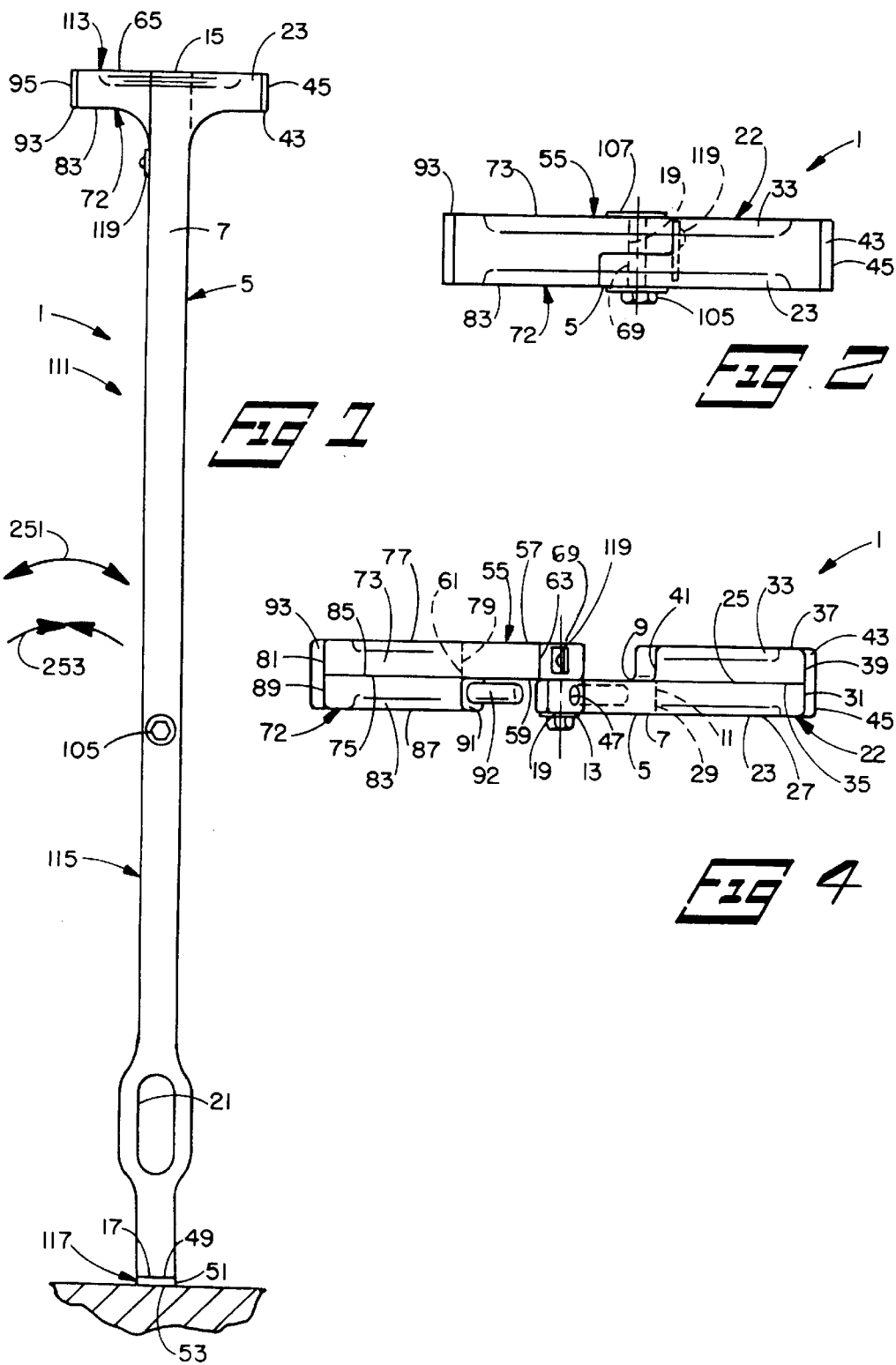

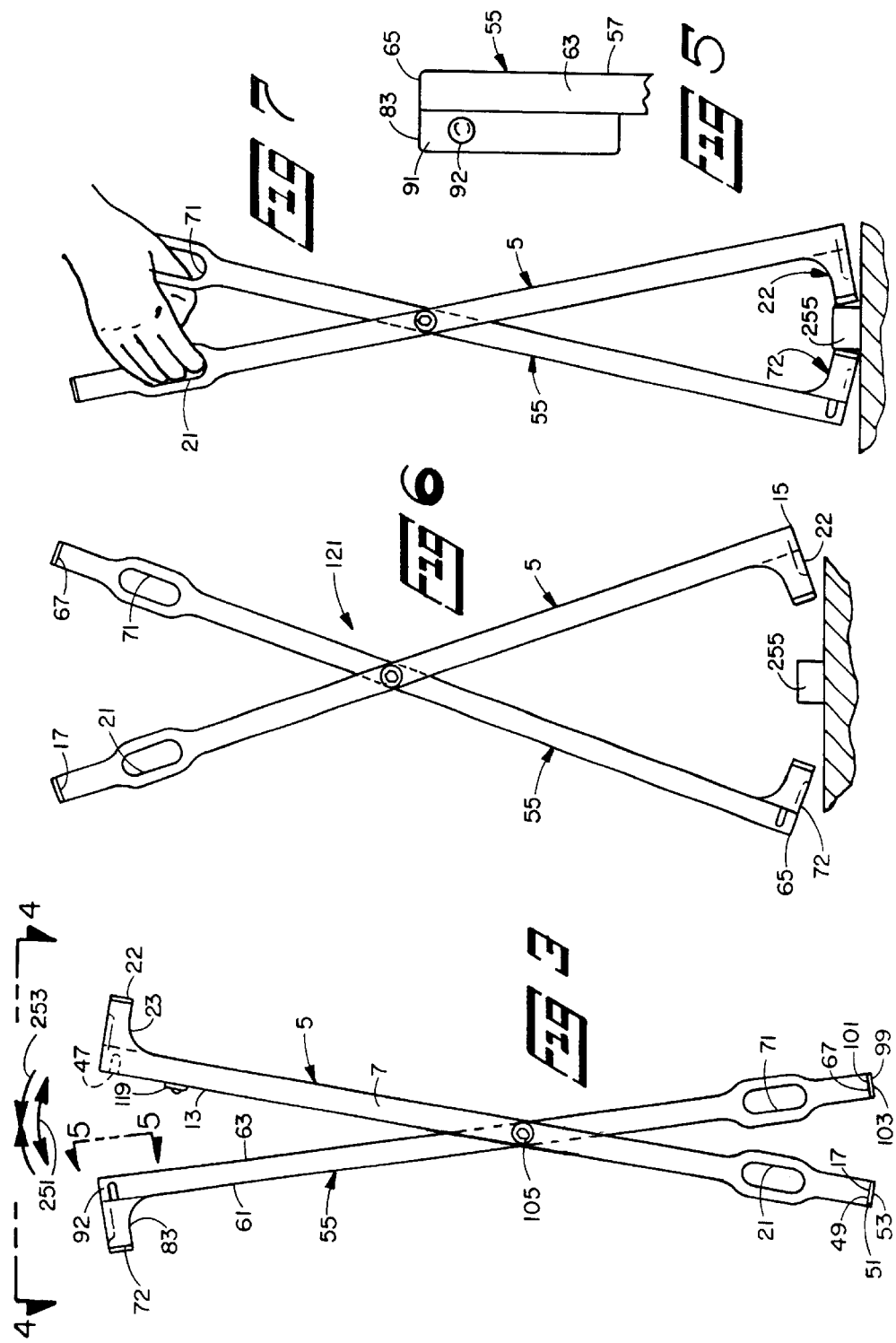

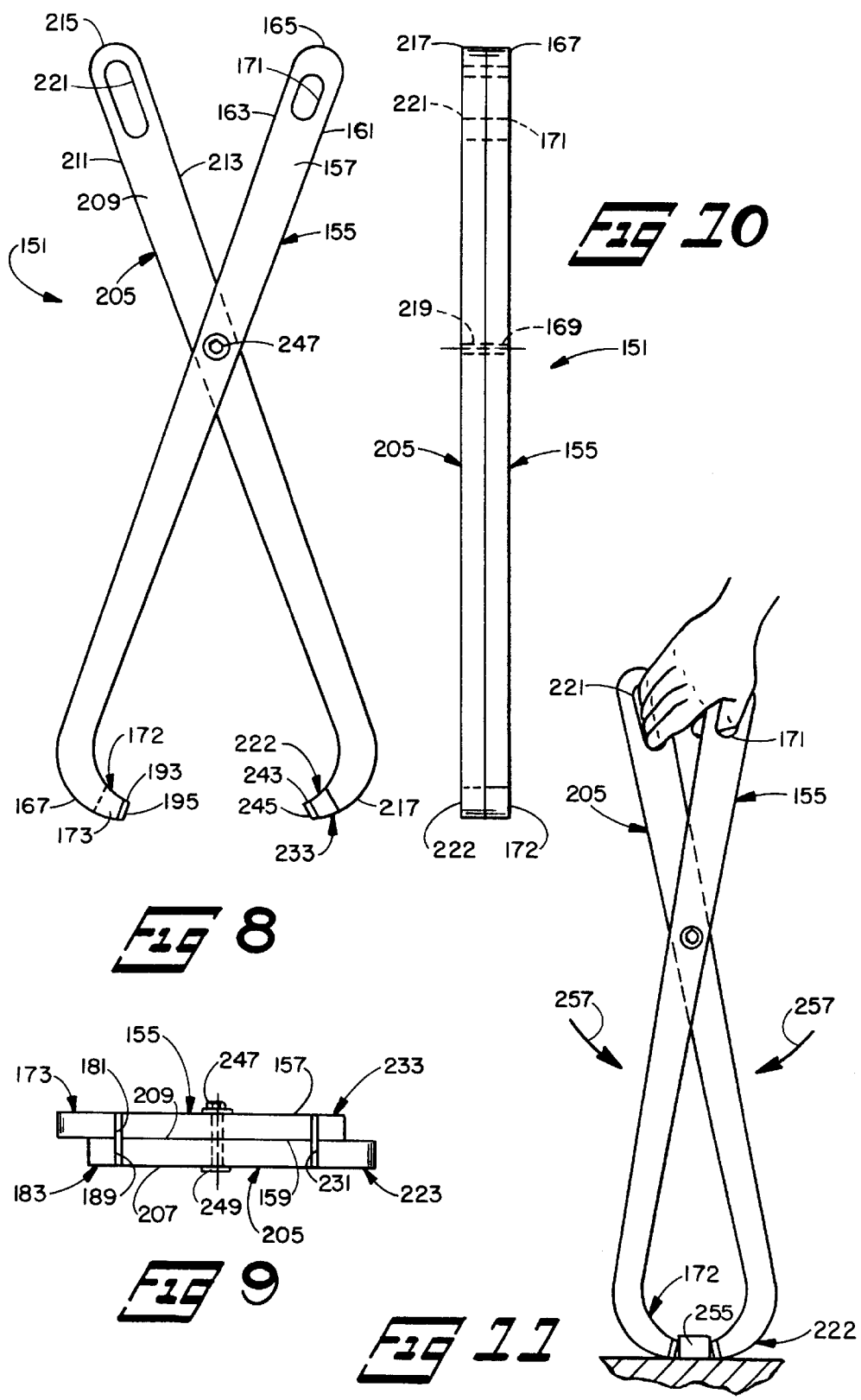

CANE AND GRABBER

FIELD OF INVENTION

This invention pertains to apparatus having a pair of gripping pieces that cooperate to aid a user to grab objects out of the user's normal reach.

BACKGROUND OF THE INVENTION

People sometimes lose mobility when they age or if they become disabled. Often the elderly and disabled cannot bend over to pick up objects off the ground. A conventional cane can be an effective aid for enabling elderly and disabled persons to move about without the assistance of others. However, conventional canes offer little assistance to the person attempting to pick up objects out of the user's reach, such as off the ground.

An elongated clip, such as the one shown in U.S. Pat. No. 5,192,104 to Lin, can be used to grasp objects and pick them up off the ground. Such a device, however, provides little assistance in helping the person move about without the aid of others or other devices. The person in need of assistance still needs to use a device such as a cane to move about. It is undesirable to carry two devices, one for assisting the user move about and a second for grasping objects.

Some canes, such as the ones described in U.S. Pat. No. 5,392,800 to Sergi and U.S. Pat. No. 5,640,985 to Snyder, have a trigger attached to a gripping claw or finger with a cable or cord. One problem with these and similar designs is that the cable or cord can break, or otherwise become damaged or twisted, which would hinder the operation of the device.

Other devices have pieces that can be easily hit and knocked off or broken. Examples of such devices are shown in U.S. Pat. No. 5,176,160 to Osborn and U.S. Pat. No. 6,058,953 to Stefanelli. The durability of these devices is therefore limited.

Other designs suffer from the problem of applying an inappropriate amount of force to an object. Such a problem is apparent with motorized devices, such as the one shown in U.S. Pat. No. 4,827,956 to Toot. The Toot patent shows a motor that urges gripping members together. A problem with this design is that the amount of force developed by the motor can crush or otherwise damage the object being grasped. Alternatively, the motor may not provide enough force to adequately grab the object as it is being lifted off the ground.

Thus, a need exists for an improved cane and grabber.

SUMMARY OF THE INVENTION

In accordance with the present invention, a grabber is provided that is free of easily breakable component parts and that allows a user to accurately and easily control the amount of force applied to objects that are grabbed.

The grabber is made of a strong and durable material, such as wood or plastic. In one embodiment, the grabber can be used to perform two functions: it can be used to aid in walking and also to grab objects off the ground without requiring the user to bend over. The invention has two arms. Each arm has a first end and a second end, which define the arm's length in the longitudinal direction. The longitudinal length is approximately equal to the distance from the ground to the hip of a person. Each arm has an inner surface, an outer surface, and two side surfaces. A pivot hole is formed through each arm between the first and second ends. The arms are pivotally attached to one another and can pivot relative to each other around their respective pivot holes. The inner surface of each arm is in facing contact with the other. A slot is formed through each arm from the inner surface to the outer surface proximal the second end, between the pivot hole and the second end.

A gripping piece is on the first end of each arm. According to one aspect of the invention, the gripping piece is comprised of an ear, a lug, and a pad. One ear is on the first end of each arm. Each ear has a joint end and a free end. Each free end is laterally displaced from the joint end. There is a lug on each ear. Each ear and respective lug are like-shaped. Each lug has a free end and an opposed abutting end. The free ends of each ear and respective lug are coplanar, and a pad is connected to the free ends. A centering hole is formed in the second side surface of the first arm, and a centering pin extends from the abutting end of the lug on the second arm. A clasp is attached to the first arm. The clasp allows the arms to be locked in one position relative to the other.

One function of the grabber is that of a walking cane. The arms are aligned in a first position, such that the cane has a handle, a shaft, and a foot. The shaft is formed from the two arms aligned in the longitudinal direction. The foot is formed from the aligned second ends. The gripping piece and first end of the first arm interfit and cooperate with the gripping piece and first end of the second arm to create a smooth and continuous handle. The gripping piece of each arm protrudes equidistantly in opposite directions from the shaft, such that the walking cane handle is centered upon the shaft. The abutting end of the lug of the second arm abuts the first side surface of the first arm. The abutting end of lug of the first arm abuts the first side surface of the second arm. The abutting surface of the lugs prevents bi-directional pivoting of the arms when the grabber functions as a cane. The clasp is used to keep the invention functioning as a cane by preventing the arms from pivoting relative to each other. The centering pin extending from the lug of the second arm is received within the centering hole of the first arm. This prevents the arms from spreading apart.

A second function of the grabber is to grab and pick up an object off the ground while the user remains standing. To enable the grabber to perform this function, the clasp is unlocked and the arms are pivoted nearly 360 degrees relative to each other to a second alignment position, In the second alignment position, the gripping pieces of the two arms face each other. A person inserts one or more fingers through the slots in the first and second arms in order to pivot and manipulate the arms. The gripping pieces of each arm cooperate in response to the pivoting and manipulation of the arms. The user directly controls the amount of force applied to the object by varying the amount of force applied to the slots. Further, a person can remain standing in an upright position while grabbing an object off the ground between the gripping pieces.

It is apparent to those skilled in the art that the user can easily switch the apparatus from a walking cane to a grabber, and vice versa. The user simply pivots the arms nearly 360 degrees relative to each other.

Another advantage of the present invention is that it is durable. The present invention is free from parts that can be easily knocked off or broken.

A second embodiment of the present invention functions to grab and pick up objects off the ground without requiring the user to bend over, but without also functioning as a walking cane. The second embodiment has two arms. Each arm has a first end and a second end, which together define the arm's length in the longitudinal direction. The arms' length may be the same as in the first embodiment. Each arm has an inner surface, an outer surface, and two side surfaces. A pivot hole is formed through each arm between the first end and the second end. The arms are pivotally attached to one another and can pivot relative to each other around their respective pivot holes. The inner surfaces of the arms are in facing contact with the other. A slot is formed through each arm from the inner surface to the outer surface proximal the second end, between the pivot hole and the second end.

A gripping piece is formed on the first ends of both arms. In one embodiment, the gripping piece comprises an ear, a lug, and a pad. An ear is on the first end of each arm. Each ear has a joint end and a free end. Each free end is laterally displaced from the joint end. There is a lug is on each ear. Each ear and respective lug are like-shaped. Each lug has a free end and an end proximal its respective arm. The free ends of each ear and respective lug are coplanar. A pad is connected to the free ends.

A user grips the slots in the first and second arms to pivot the arms and manipulate the grabber. The gripping pieces cooperate in response to pivoting the arms and manipulation of the slots. By urging the slots together, the user also urges the gripping pieces together. A person can remain standing and grab an object from the ground between the gripping pieces.

Other advantages, benefits, and features of the invention will become apparent to those skilled in the art upon reading the detailed description of the invention and studying the drawings.

BRIEF DESCRIPTION OF THE DRAWINGS

FIG. 1 is a front view of a first embodiment of the present invention in cane function.

FIG. 2 is a top view of the first embodiment of the present invention showing the gripping piece and first end of the first arm interfitted with the gripping piece and first end of the second arm to form a smooth and continuous handle.

FIG. 3 is a front view of the first embodiment of the present invention showing the arms pivoted relative to each other.

FIG. 4 is a view taken along line 4—4 of FIG. 3.

FIG. 5 is a view taken alone line 5—5 of FIG. 3.

FIG. 6 is a front view of the first embodiment of the present invention functioning as a grabber.

FIG. 7 is a front view of the first embodiment of the present invention functioning as a grabber showing fingers gripping the slot in the first arm and a thumb gripping the slot in the second arm, and the gripping pieces of each arm cooperating to grab an object.

FIG. 8 is a front view of a second embodiment of the present invention.

FIG. 9 is a view taken along line 9—9 of FIG. 8.

FIG. 10 is a side view of the second embodiment of the present invention shown in FIGS. 8 and 9.

FIG. 11 is a front view of the second embodiment of the present invention showing fingers gripping the slot in the first arm and a thumb gripping the slot in the second arm, and the gripping pieces of each arm cooperating to grab an object.

DETAILED DESCRIPTION OF THE PREFERRED EMBODIMENT

Although the disclosure hereof is detailed and exact to enable those skilled in the art to practice the invention, the physical embodiments herein disclosed merely exemplify the invention, which may be embodied in other specific structure. The scope of the invention is defined in the claims appended hereto.

Referring to FIGS. 1–7, the grabber 1 comprises a first arm 5 and a second arm 55. The grabber 1 is preferably made of a strong and durable material, such as wood or plastic. However, other suitable materials such as metal could be used without departing from the broad aspects of the invention.

The first arm 5 has an outer surface 7 and an opposed inner surface 9, and a first side surface 11 and an opposed second side surface 13. Inner and outer surfaces 7 and 9 are parallel with each other. First and second side surfaces 11 and 13 are generally parallel with each other. Inner and outer surfaces 7 and 9 are perpendicular with first and second side surfaces 11 and 13. Hence, the arm 5 has a generally rectangular cross sectional shape. The first arm 5 has a first end 15 and an opposed second end 17, which defines the longitudinal length of the arm 5. The longitudinal length of the arm 5 is approximately equal to the distance from the ground to the hip of a person. The longitudinal arm length can vary without departing from the broad aspects of the invention such that the length can vary to accommodate people of different heights. A pivot hole 19 is formed through the arm 5 from the outer surface 7 to the inner surface 9, between the first and second ends 15 and 17. A slot 21 is formed through the arm 5 from the outer surface 7 to the inner surface 9, proximal the second end 17 between the pivot hole 19 and second end 17. The slot 21 is large enough to insert one or more human fingers through.

A gripping piece 22 is located at the first end 15 of arm 5. Gripping piece may be comprised of an ear 23, lug 33, and pad 43. The ear 23 has an inside surface 25 and opposed outside surface 27. The ear 23 has joint end 29 and opposed free end 31. The joint end 29 is integral with the first side surface 11 of the first arm 5. As described, the first arm 5 and ear 23 are both parts of a single piece of material. Alternatively, the ear 23 could be formed from a different piece of material and connected to the first arm 5 at the joint end 29 without departing from the broad aspects of the invention. The ear free end 31 is laterally displaced from the first arm 5.

A lug 33 has an inside surface 35 and opposed outside surface 37. The lug 33 also has a free end 39 and an abutting end 41. The lug 33 and respective ear 23 are like-shaped. The inside surface 35 of the lug 33 is connected to the inside surface 25 of the ear 23. Glue or another suitable adhesive was used to connect the lug 33 to the ear 23. Alternatively, the lug 33 and ear 23 could be formed from a single piece of material. The abutting end 41 is coplanar with joint end 29 of ear 23. The free end 39 of the lug is coplanar with the free end 31 of the ear 23. A pad 43 is attached to free ends 31 and 39. The pad 43 has a surface 45. A centering hole 47 is formed into the second side surface 13 of the first arm 5 in a direction perpendicular to the second side surface 13.

The second end 17 of the arm 5 has an end surface 49. A pad 51 is attached to the second end surface 49. The pad 51 has a surface 53.

The second arm 55 is shaped similar to the first arm 5. The second arm has an outer surface 57 and opposed inner surface 59, and a first side surface 61 and opposed second side surface 63. The first and second arms 5 and 55 have similar cross sections. The second arm 55 has a first end 65 and an opposed second end 67, which together define the longitudinal length of the second arm 55. The longitudinal length of the second arm 55 is equal to the longitudinal length of the first arm 5. A pivot hole 69 is formed through the arm 55 from the outer surface 57 to the inner surface 59, between the first and second ends 65 and 67. A slot 71 is formed through the arm 55 from the outer surface 57 to the inner surface 59 proximal the second end 67, between the pivot hole 69 and second end 67. The slot 71 is large enough to insert one or more human fingers through. The pivot hole 69 and slot 71 of the second arm 55 are located in the same place relative to the first and second ends 65 and 67 as the pivot hole 19 and slot 21, respectively, of the first arm 5.

A gripping piece 72 is located at the first end 65 of arm 55. Gripping piece may be comprised of an ear 73, lug 83, and pad 93, each of which is described in detail hereafter.

The ear 73 is located adjacent the first end 65 of the arm 55. The ear 73 has an inside surface 75 and opposed outside surface 77. The ear has a joint end 79 and a free end 81. The joint end 79 is integral with the first side surface 61 of the first end 65 of the first arm 55. As described, ear 73 and arm 55 are both formed from a single piece of material. Alternatively, the ear 73 could be formed from a different piece of material and connected to the arm 55 with an adhesive or other suitable fastening means. Free end 81 is laterally displaced from the joint end 79 of the ear 73 away from the second arm 55.

The lug 83 is connected to the ear 73. The lug 83 has an inside surface 85 and opposed outside surface 87. The lug 83 also has a free end 89 and an abutting end 91. Lug 83 and ear 73 are like-shaped. The inside surface 85 of the lug 83 is connected to the inside surface 75 of the ear 73. Surfaces 75 and 85 are preferably glued together. However, the lug 83 and ear 73 could alternatively be formed from a single piece of material. Free end 89 and free end 81 are coplanar. The pad 93 is attached to free end surfaces 81 and 89. The pad 93 has a surface 95. Abutting end 91 of the lug 83 is flat and coplanar with joint end 79 of the ear 73.

A centering pin 92 extends perpendicularly away from the abutting end 91 of the lug 83. The inner surface 59 of the second arm 55 protects the centering pin 92 from being knocked off or otherwise damaged, by limiting exposure to the pin 92. The second end 67 of the arm 55 has an end surface 99. A pad 101 is attached to the second end surface 99. The pad 101 has a surface 103.

The first and second arms 5 and 55, respectively, are pivotally attached with a pivot nut 105 and a pivot bolt 107. The pivot bolt 107 is inserted through pivot holes 19 and 69 and received within pivot nut 105. The inner surface 9 of the first arm 5 is adjacent to and faces the inner surface 59 of the second arm 55.

The grabber 1 performs two functions, each of which is described in detail hereafter. A person selectively chooses which function to use.

One function of the apparatus 1 is that of a walking cane 111. The walking cane 111 has a handle 113, a shaft 115, a foot 117 and a clasp 119. The shaft 115 is comprised of the first and second arms. The foot 117 is comprised of the second ends 17 and 67 of the first and second arms. The handle 113 is comprised of the gripping piece 22 and first end 15 of arm 5, and gripping piece 72 and first end 65 of the second arm 55. The width of the handle 113, shaft 115, and foot 117 is twice that of each individual arm 5 and 55, measured between the outer surfaces 7 and 57 and inner surfaces 9 and 59, respectively.

The arms 5 and 55 are aligned side-by-side in a first alignment position to function as a walking cane. The first ends 15 and 65 of the respective first and second arms are adjacent each other in this alignment position. The first ends 15 and 65 of each respective arm and the gripping pieces 22 and 72 interfit with each other and cooperate to form a smooth and continuous handle 113. Gripping pieces 22 and 72 extend in the opposite direction relative the shaft 115. When functioning as a cane, the abutting end 41 of lug 33 abuts the first side surface 63 of the opposite arm 55. Also, the abutting end 91 of lug 83 abuts the first side surface 13 of the opposite arm 5. These abutments prevent bi-directional pivoting of the arms when the arms are in the first alignment position. That is, the arms are allowed to pivot relative to each other only in one direction 251 relative to the first alignment position. The arms 5 and 55 cannot pivot in a second direction 253 relative to the first alignment position.

The centering pin 92 of the lug 83 of the second arm 55 is inserted into the centering hole 47 of the first arm 5 to ensure and enhance this cooperation between parts. The centering pin 92 and centering hole 47 prevent the inner surfaces 9 and 59 of the first and second arms 5 and 55, respectively, from spreading apart relative to each other.

A clasp 119 is attached to the second side surface 13 of the first arm 5, and can be of a type well known in the art. The clasp 119 can be selectively alternated between locked and unlocked positions. In the locked position, one end of the clasp 119 is located against the first side surface 61 of the second arm 55. The clasp 119 then retains the first and second arms in the first alignment position and prevents the second arm 55 from pivoting relative to the first arm 5 in the first direction 251.

When functioning as a cane 111, the slots 21 and 71 are aligned to form a decorative hole through the walking cane 111. The surface 53 and 103 of pads 51 and 101, respectively, provide a secure contact with the ground to prevent slipping.

The apparatus 1 also functions as a grabber 121. The clasp 119 must first be rotated to its unlocked position before changing from a walking cane 111 to a grabber 121. To change alignment, the arms 5 and 55 are simply pivoted nearly 360 degrees relative to each other in direction 251. The first and second gripping pieces 22 and 72 cooperate to enable a person to grab an object 255 off the ground while standing straight up. The user operates the grabber 121 by gripping slots 21 and 71 with the user's thumb and fingers. The user then positions the first and second gripping pieces 22 and 72 over the object 255 Manipulation of the slots 21 and 71 towards each other causes the first and second gripping pieces 22 and 72 to move towards each other in direction 251 and grab the object 255.

Several advantages of the present invention are apparent. The user can easily switch the invention from functioning as a walking cane 111 to a grabber 121. As described above, the user simply pivots the arms 5 and 55 relative to each other in direction 251. To switch back to a cane 111 from a grabber, the arms are rotated in direction 253 relative to each other. Further, there are no pieces of the apparatus that can be easily knocked off or broken.

A second embodiment of the present invention functions solely as a grabber 151. The grabber 151 has a first arm 155 and a second arm 205, and is shown in FIGS. 8–11. First arm 155 has an outer surface 157 and an opposed inner surface 159, and a first side surface 161 and an opposed second side surface 163. Inner and outer surfaces 157 and 159 may be parallel with each other. First and second side surfaces 161 and 163 may be parallel with each other. Inner and outer surfaces 157 and 159 may be perpendicular with first and second side surfaces 161 and 163. Hence, the arm 155 has a generally rectangular cross sectional shape. The first arm 155 has a first end 165 and an opposed second end 167, which together define the longitudinal length of the arm 155. The longitudinal length of the arm 155 is approximately equal to the distance from the ground to the hip of a person. The longitudinal arm length can vary without departing from the broad aspects of the invention such that people having different heights may use the invention to pick an object off the ground without bending over. A pivot hole 169 is formed through the arm 155 from the outer surface 157 to the inner surface 159, between the first and second ends 165 and 167. A slot 171 is formed through the arm 155 from the outer surface 157 to the inner surface 159 proximal the first end 165, between the pivot hole 169 and first end. The slot 171 is large enough to insert one or more human fingers through.

A gripping piece 172 is located at the second end 167 of arm 155. The gripping piece 172 may be comprised of an ear 173, lug 183, and pad 193. In the illustrated construction, the ear 173 is curved and is integral with the first arm 155 at the arm second end 167. The ear 173 has an inwardly facing free end 181. The lug 183 is on the inside surface of the curved ear, which is coplanar with the inside surface 159 of the first arm. The lug 183 has a free end 189 that is coplanar with the ear free end 181. As described the ear 173 and the lug 183 are separate pieces. Glue or any other suitable adhesive can be used to connect the lug 183 and ear 173. As an alternative, the lug 183 and ear 173 may be formed from a single piece of material. A pad 193 is attached to the free ends 181 and 189 of the ear and lug, respectively. The pad 193 has a surface 195.

The second arm 205 is shaped similar to the first arm 155. The second arm 205 has an outer surface 207 and opposed inner surface 209, and a first side surface 211 and opposed second side surface 213. The first and second arms 155 and 205 have similar cross sections. The second arm 205 has a first end 215 and an opposed second end 217, which together define the longitudinal length of the second arm 205. The longitudinal length of the second arm 205 is equal to the longitudinal length of the first arm 155. A pivot hole 219 is formed through the arm 205 from the outer surface 207 to the inner surface 209, between the first and second ends 215 and 217. A slot 221 is formed through the arm 205 from the outer surface 207 to the inner surface 209 proximal the first end 215, between the pivot hole 219 and first end 215. The slot 221 is large enough to insert one or more human fingers through. The pivot hole 219 and slot 221 of the second arm 205 are located in the same place relative to the first and second ends 215 and 217 as the pivot hole 169 and slot 171 of the first arm 155.

A gripping piece 222 is located at the second end 217 of arm 205. Gripping piece 222 may be comprised of an ear 223, lug 233, and pad 243. Like the ear 173, the ear 223 is integral with and is inwardly curved from the arm 205. The ear 223 has an inwardly facing free end 231. The lug 223 is on the inside surface of the ear 223, which is coplanar with the inside surface 209 of the second arm. the lug 233 has a free end 239 that is coplanar with the ear free end 231. Glue or other suitable adhesive may be used for this connection. Alternatively, the lug 233 and curved ear 223 could be formed from a single piece of material. A pad 243 is attached to free ends 231 and 239 of the ear and lug, respectively. The pad 243 has a surface 245.

The first and second arms 155 and 205 are pivotally attached with a pivot nut 247 and a pivot bolt 249. The pivot bolt 249 is inserted through pivot holes 169 and 219 and received within pivot nut 247. The inner surface 159 of the first arm 155 is in facing contact with the inner surface 209 of the second arm 205.

The grabber 151 functions to allow a person to grab an object and pick it up from the ground without bending over, but without also functioning as a cane. The user operates the grabber 151 by gripping the slots 171 and 221 in the first and second arms 155 and 205, respectively. The person orients the grabber 151 over an object 255 such that the object is positioned between the gripping pieces 172 and 222. The user urges the slots 171 and 221 together thereby causing the gripping pieces 172 and 222 to be urged together in direction 257. The gripping pieces 172 and 222 cooperate to grab an object and pick it up from the ground. The user directly controls the amount of force being applied to an object by controlling the amount of force applied to the slots 171 and 221. The user is thus unlikely to inadvertently crush an object.

Thus it is apparent that there has been provided, in accordance with the invention, a cane and grabber that fully satisfies the aims and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

I claim:

1. A grabber for grabbing objects off the ground comprising:

a. a first arm lying in a first plane and having a first end and a second end with a length therebetween that is approximately the distance between the ground and the hip of a person, said first end of said first arm having a first gripping piece, and a first slot being formed through said first arm proximate said second end of said first arm;

b. a second arm lying in a second plane and having a first end and a second end with a length therebetween that is approximately the distance between the ground and the hip of a person, said first end of said second arm having a second gripping piece, and a second slot being formed through said second arm proximate said second end of said second arm; and c. a pivotal connection between said first and second arms, the slots in said first and said second arms being sized and shaped to receive fingers and a thumb, respectively, of a standing person such that manipulation of the fingers and thumb causes the arms to pivot relative to each other and enables said first and said second gripping pieces to cooperate with one another to grab an object on the ground without requiring the person to bend over, wherein said first gripping piece comprises a first ear immovably on the first arm and a first lug on the first ear, said first lug lying substantially in said second plane, and wherein the second gripping piece comprises a second ear immovably on the second arm and a second lug on the second ear, said second lug lying substantially in said first plane.

2. A grabber for grabbing objects off the ground comprising:

a. a first arm having a first end and a second end with a length therebetween that is approximately the distance between the ground and the hip of a person, said first end of said first arm having a first gripping piece, and a first slot being formed through said first arm proximate said second end of said first arm;

b. a second arm having a first end and a second end with a length therebetween that is approximately the distance between the ground and the hip of a person, said first end of said second arm having a second gripping piece, and a second slot being formed through said second arm proximate said second end of said second arm; and c. a pivotal connection between said first and second arms, the slots in said first and said second arms being sized and shaped to receive fingers and a thumb, respectively, of a standing person such that manipulation of the fingers and thumb causes the arms to pivot relative to each other and enables said first and said second gripping pieces to cooperate with one another to grab an object on the ground without requiring the person to bend over, wherein said first gripping piece comprises a first ear on the first arm and a first lug on the first ear, and wherein the second gripping piece comprises a second ear on the second arm and a second lug on the second ear, and wherein each first and second ear and lug have respective coplanar free ends, and wherein each first and second gripping piece further comprises a pad on the associated ear and lug, free ends.

3. The grabber of claim 2 wherein said first and second arms are pivotable to a first alignment position such that the first end of said first arm and said first gripping piece interfit and cooperate with said first end o f said second arm and said second gripping piece to create a smooth and continuous handle, and wherein the first and second arms cooperate to form a shaft to thereby enable the grabber to function as a walking cane.

4. The grabber of claim 3 further comprising means for selectively retaining the first and second arms in the first alignment position thereof.

5. The grabber of claim 2 wherein:

a. said first arm further has a first and a second side surface with a centering hole in said second side surface proximate said first end of said first arm; and b. said lug of said second arm has a centering pin extending therefrom, said centering pin becoming inserted into said centering hole when said first end of each of said first and said second arms are adjacent each other.

6. A combination cane and grabber comprising:

a. a first arm and a second arm each having first and second ends and respective inside, outside, and opposed first side and second side surfaces, said inside surfaces of said arms being in facing contact with each other, each of said arms defining an opening proximate said second end thereof, the arms having respective lengths that are approximately the distance from the ground to a hip of a person standing on the ground;

b. a pivotal connection between said arms between said first and said second ends; and c. a first and a second gripping piece integral the first ends of said first and second arms, respectively, the arms being selectively pivotable relative to each other to a first alignment position whereat the cane and grabber functions as a walking cane with the first and second gripping pieces interfitting and cooperating to form a handle, the first and second arms cooperating to form a shaft, and the second ends of the arms forming a foot of the walking cane, the arms being further selectively pivotable to a second alignment position whereat a person manipulates the second ends of the arms and thereby causes the first and second gripping pieces to cooperate to grab an object off the ground without requiring a standing person to bend over.

7. The combination cane and grabber of claim 6 wherein:

a. said first gripping piece comprises a first ear on the first arm, and a first lug on the first ear; and b. said second gripping piece comprises a second ear on the second arm, and a second lug on the second ear.

8. The combination cane and grabber of claim 7 wherein the first and second ears, the first and second lugs, and the first ends of the first and second arms cooperate to form the handle for a walking cane.

9. The combination cane and grabber of claim 3 wherein:

a. the first ear and first lug define respective coplanar first free ends;

b. the second ear and second lug define respective coplanar second free ends; and c. the object is grabbed off the ground between the first and second coplanar free ends of the first and second ears and lugs, respectively.

10. The combination cane and grabber of claim 6 further comprising a clasp on a selected one of the first and second arms that cooperates with the other of the selected one of the first and second arms to selectively retain the cane and grabber in the first alignment position.

11. The combination cane and grabber of claim 6 further comprising:

a. a centering hole formed in said second side surface of said first arm proximal said first end of said first arm; and b. a centering pin extending from said lug of said second arm, whereby said centering pin is received within said centering hole when said first and second arm's first ends are adjacent each other.

12. A method of grabbing an object off the ground by a standing person comprising the steps of:

a. providing a grabber comprising the steps of:
i. providing a pair of arms having respective first and second ends of a length approximately equal to the distance between the ground and a hip of a person;
ii. providing first and second gripping pieces on the first ends of the first and second arms, respectively; and
iii. pivotally connecting the arms to each other;

b. pivoting the arms to a first alignment position;

c. manipulating the second ends of the arms by a hand of a standing person in a manner that moves the gripping pieces on the arms toward each other and thereby enables the gripping pieces to grab an object on the ground without requiring the person to bend;

d. pivoting the arms approximately 360 degrees relative to each other from the first alignment position to a second alignment position;

e. interfitting the gripping pieces of the first and second arms with each other and forming a smooth and comfortable handle, and aligning the first and second arms alongside each other; and f. using the first and second arms as a shaft and using the interfitted griping pieces as a handle of a walking cane.

13. The method of claim 12 comprising the further step of inserting a pin in the first gripping piece into the second arm when the arms are in t he second alignment position and thereby preventing the arms from separating apart from each other.

14. The method of claim 12 comprising the further step of releasably retaining the first and second arms in the second alignment position.

* * * * *

UNITED STATES PATENT AND TRADEMARK OFFICE
CERTIFICATE OF CORRECTION

PATENT NO. : 6,527,321 B1   Page 1 of 1
DATED : March 4, 2003
INVENTOR(S) : Kuciauskas It is certified that error appears in the above-identified patent and that said Letters Patent is hereby corrected as shown below:

<u>Title page,</u>
Item [56], U.S. PATENT DOCUMENTS, insert:

| | | |
|---|---|---|
| 833,485 | 10-1906 | Rud |
| 840,229 | 01-1907 | Moss |
| 2,812,950 | 11-1957 | Holloway |
| 2,225,114 | 12-1940 | Hoskins |
| 5,176,160 | 01-1993 | Osborn, George M. |
| 4,827,956 | 05-1989 | Toot, William W. |
| 5,433,234 | 07-1995 | Lapere, Samuel |
| 4,005,893 | 02-1977 | Tash, George |
| 1,104,470 | 07-1914 | Bilson |
| 650,539 | 05-1900 | Lawson et al. |
| 1,125,983 | 01-1915 | Dulin |

After last cited U.S. PATENT DOCUMENTS, insert:
-- OTHER PUBLICATIONS
   Duro/med Industries, online product advertisement, viewed
   at http://store.yahoo.com/comfort/scisreac.html on
   June 27, 2003. --

Signed and Sealed this

Third Day of February, 2004

JON W. DUDAS
*Acting Director of the United States Patent and Trademark Office*